US006989980B2

(12) United States Patent
Kitagawa

(10) Patent No.: US 6,989,980 B2
(45) Date of Patent: Jan. 24, 2006

(54) SEMICONDUCTOR DEVICE HAVING A PROTECTION CIRCUIT

(75) Inventor: Nobutaka Kitagawa, Machida (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/800,999

(22) Filed: Mar. 16, 2004

(65) Prior Publication Data
US 2005/0057873 A1 Mar. 17, 2005

(30) Foreign Application Priority Data
Sep. 12, 2003 (JP) ............................. 2003-321060

(51) Int. Cl.
H02H 3/20 (2006.01)
H02H 9/00 (2006.01)
(52) U.S. Cl. ....................................... 361/91.1; 361/56
(58) Field of Classification Search .............. 361/91.1, 361/56, 111; 257/355
See application file for complete search history.

(56) References Cited

U.S. PATENT DOCUMENTS

| 5,173,755 A * | 12/1992 | Co et al. ..................... 257/361 |
| 6,465,848 B2 * | 10/2002 | Ker et al. .................... 257/355 |
| 6,566,715 B1 * | 5/2003 | Ker et al. .................... 257/355 |
| 6,690,067 B2 * | 2/2004 | Ker et al. .................... 257/355 |
| 6,455,902 B1 * | 3/2004 | Voldman ..................... 257/378 |
| 6,704,179 B2 * | 3/2004 | Voldman ..................... 361/56 |
| 2003/0016479 A1 | 1/2003 | Song |
| 2003/0026054 A1 * | 2/2003 | Hulfachor et al. .......... 361/111 |

FOREIGN PATENT DOCUMENTS

| JP | 7-44250 | 2/1995 |
| JP | 11-332089 | 11/1999 |
| WO | WO 01/78148 A1 | 10/2001 |

OTHER PUBLICATIONS

Ming-Dou Ker, et al., "Substrate-Triggered ESD Protection Circuit Without Extra Process Modification", IEEE Journal of Solid-State Circuits, vol. 38, No. 2, Feb. 2003, pp. 295-302.

Steven H. Voldman, et al., "An Automated ESD CAD System for BiCMOS SiGe Technology: A New Millennium for ESD Design", IBM Micronews, vol. 8, No. 2, Second Quarter 2002, pp. 29-32.

* cited by examiner

Primary Examiner—Stephen W. Jackson
Assistant Examiner—Z Kitov
(74) Attorney, Agent, or Firm—Oblon, Spivak, McClelland, Maier & Neustadt, P.C.

(57) ABSTRACT

A semiconductor device having a protection circuit comprising an NPN type bipolar transistor having a collector and an emitter connected between an external connection terminal of the semiconductor device to be protected and a reference terminal, a PMOS transistor having a drain and source connected between the base and the collector of the NPN type bipolar transistor and configured to supply a base current to the base of the NPN type bipolar transistor, and a control circuit configured to supply the control signal to the gate of the PMOS transistor in response to a voltage emerging on the external connection terminal.

2 Claims, 4 Drawing Sheets

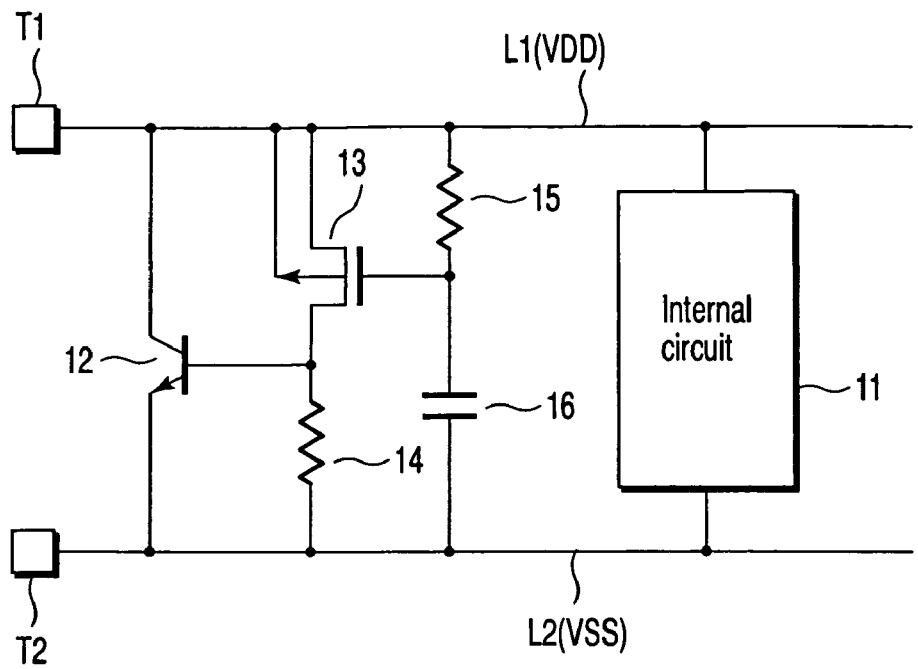
F I G. 1
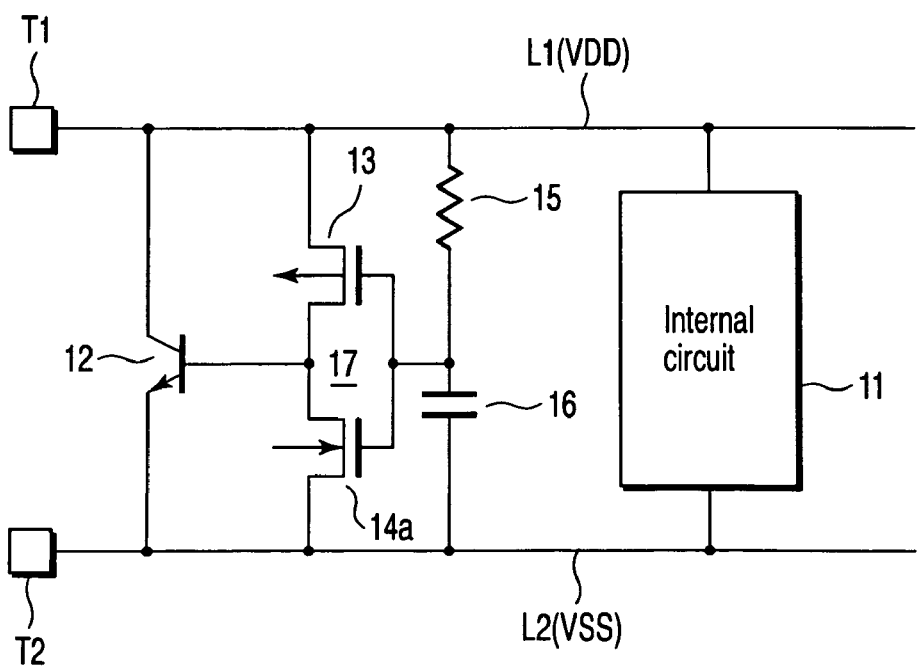
F I G. 2

SEMICONDUCTOR DEVICE HAVING A PROTECTION CIRCUIT

CROSS-REFERENCE TO RELATED APPLICATIONS

This application is based upon and claims the benefit of priority from the prior Japanese Patent Application No. 2003-321060, filed Sep. 12, 2003, the entire contents of which are incorporated herein by reference.

BACKGROUND OF THE INVENTION

1. Field of the Invention

The present invention relates to a semiconductor device having a protection circuit for securing protection against any voltage higher than a preset dielectric breakdown voltage, and to a semiconductor device having a protection circuit for protecting a to-be-protected semiconductor device from a damage, such as a dielectric breakdown resulting from an electrostatic discharge (hereinafter referred to as an ESD).

2. Description of the Related Art

In order to protect a semiconductor device from a damage resulting from the ESD, various protection circuits using a device such as an SCR and protection MOS transistor have conventionally been used. Generally, this type of protection circuit is formed between an external connection terminal liable to suffer the ESD from an outside and a reference terminal, for example, between a power supply terminal and a ground terminal, so as to prevent any damage resulting from the ESD to an internal circuit of the semiconductor device to be protected. When any high voltage caused by the ESD is applied to the external connection terminal, then the protection circuit detects this high voltage and allows the static electricity to be discharged onto the ground terminal. At this time, no zero voltage occurs in a discharge path of the protection circuit and a hold voltage resulting from the protection circuit is generated across the external connection terminal and the reference terminal. The hold voltage is also called a clamp voltage resulting from the protection circuit.

when the shrinkage of any element, such as an MOS transistor, in the semiconductor device to be protected is progressed, the dielectric breakdown voltage of its gate insulating film is lowered and there is a possibility that, if the hold voltage of the protection circuit becomes higher than such dielectric breakdown voltage, there will occur a dielectric breakdown of the gate insulating film. Therefore, there is also a necessity for the hold voltage to be set to a lowest possible extent.

For example, in FIG. 11 of IEEE JOURNAL OF SOLID-STATE CIRCUITS, VOL. 38, No. 2 FEBRUARY 2003, "Substrate-Triggered ESD Protection Circuit Without Extra Process Modification" Ming-Dou Ker, Senior Member, IEEE, and Tung-Yang chen, Member, IEEE, a protection circuit is shown as a combination of, between an input or output pad of a to-be-protected semiconductor device and a VSS terminal, an ESD detection circuit comprising a capacitor (C) and a resistor (R) and an NMOS transistor which is used as a clamp element. However, it is necessary to provide voltages $V_{CE}$, $V_{BE}$ of an NPN bipolar transistor acting as a parasitic transistor for the NMOS transistor as well as a gate bias voltage exceeding a voltage $V_{th}$ of another NMOS transistor acting as a base current supply element of this parasitic NPN bipolar transistor. The parasitic NPN bipolar transistor and NMOS transistor, being connected as a series array, provide a clamp voltage of $V_{BE}+V_{th}$. As a result, it is not possible to provide an adequately low hold voltage, that is, clamp voltage lower than the value $V_{BE}+V_{th}$.

BRIEF SUMMARY OF THE INVENTION

In one aspect of the present invention, there is provided a semiconductor device having a protection circuit, comprising: an NPN type bipolar transistor having a collector and emitter connected between an external connection terminal of the semiconductor device to be protected and a reference terminal; a PMOS transistor having drain and source terminals connected across the base and the collector of the NPN type bipolar transistor and a gate connected to the reference terminal and configured to supply a base current to the base of the NPN type bipolar transistor; and a control circuit configured to supply a control signal to the gate of the PMOS transistor.

BRIEF DESCRIPTION OF THE SEVERAL VIEWS OF THE DRAWING

FIG. 1 is a block circuit diagram showing a circuit arrangement of one embodiment of the present invention;

FIG. 2 is a block circuit showing a circuit arrangement of another embodiment of the present invention;

DETAILED DESCRIPTION OF THE INVENTION

Figure 3:
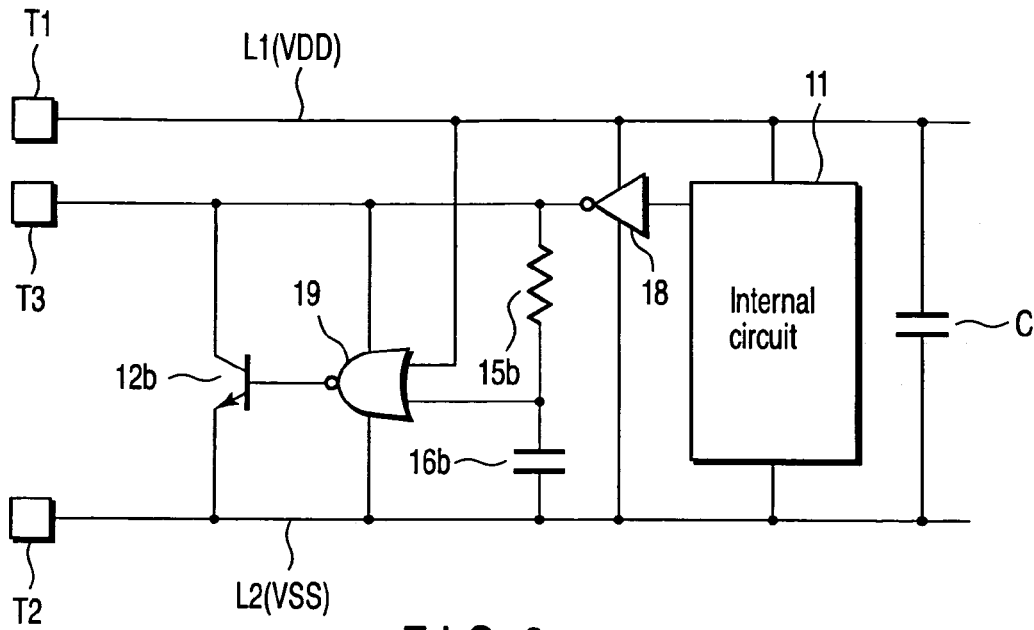
FIG. 3 is a block circuit diagram showing a circuit arrangement of a still another embodiment of the present invention.

With reference to the drawing, the embodiments of the present invention will be described in more detail below. FIG. 1 is a block circuit diagram showing a circuit arrangement of a semiconductor device having a protection circuit according to one embodiment of the present invention. In FIG. 1, a rated power supply voltage of an internal circuit 11 is supplied across power supply lines L1 and L2 respectively connected to an external connection terminal T1 and a grounded reference terminal T2. A protection circuit is connected between the internal circuit 11 on one hand and these power supply lines L1, L2 on the other. An NPN type bipolar transistor 12 has its collector and emitter connected across the power supply line L1 and the power supply line L2 and its base connected to a connection node between a PMOS transistor 13 and a resistor 14. As will be set out in more detail below, when any abnormal voltage higher than the rated power supply voltage, for example, a high voltage resulting from an ESD voltage, is applied from an outside to the external connection terminal T1, the NPN type bipolar transistor 12 acts as a current absorbing circuit for absorbing a discharge current (hereinafter referred to as an ESD current) resulting from the ESD and flowing the current into the ground terminal T2.

The PMOS transistor 13 has its source and back gate connected to the external input terminal T1 and its gate connected to a connection node between a resistor 15 and a capacitor 16. The resistor 14 has its other terminal connected to the reference terminal T2. When any abnormal high voltage, for example, the ESD voltage exerting an adverse effect on the internal circuit 11, is applied from the terminal T1, the PMOS transistor 13 supplies a base current to the base of the NPN type bipolar transistor 12. The PMOS transistor 13 serves as a base current supply circuit for setting the NPN type bipolar transistor 12 to allow a large current to flow according to its current amplification factor. Further, a series circuit of the resistor 15 and capacitor 16 constitutes a control circuit configured to control the PMOS transistor 13 in an ON/OFF fashion by detecting the ESD voltage supplied to the terminal T1 and supplying its detection output to the gate of the PMOS transistor 13. These elements 12 to 16 connected between the internal circuit 11, and the terminals T1, T2 are configured to provide a protection circuit of the semiconductor device, that is, the interval circuit 11.

Now, the operation of the first embodiment shown in FIG. 1 will be explained below.

First, let it be assumed that, with the ESD voltage not applied to the external connection terminal T1, a rated power supply voltage (VDD, VSS) is supplied across the power supply lines L1 and L2. In this state, the capacitor 16 is charged substantially to a voltage VDD level on the power supply line L1 and a potential on the connection node between the resistor 15 and the capacitor 16 becomes substantially the same level as that on the power supply line L1 and the PMOS transistor 13 is placed in an OFF state. As a result, no base current is supplied to the base of the NPN type bipolar transistor 12 and hence the NPN bipolar transistor 12 is placed in an OFF state. Therefore, when the power supply voltage VDD is supplied, the protection circuit comprising the transistors 12, 13, etc., is not operated.

An explanation will be made below about the case where, with the rated voltage VDD not supplied to the power supply line L1, a high ESD voltage is applied to the external connection terminal T1. In this case, the power supply line L2 is grounded. It is assumed that, even in all the following embodiments, the power supply line L2 is also grounded for the discharge of ESD. By the application of the ESD voltage, a voltage on the L1-connected terminal of the PMOS transistor 13 promptly goes high. At the same time, a high voltage is also applied to the collector of the NPN type bipolar transistor 12.

On the other hand, at the instant, zero potential is placed on the connection node between the resistor 15 and the capacitor 16. A potential on the gate terminal of the PMOS transistor 13 never promptly goes high due to a time constant of the resistor 15 and capacitor 16. For this reason, the PMOS transistor 13 is biased substantially in an ON state and electric current resulting from the ESD voltage flows from the PMOS transistor 13 into the base of the NPN type bipolar transistor 12 to turn the NPN type bipolar transistor 12 ON.

Generally, the NPN type bipolar transistor 12 has a very high current amplification factor hfe with respect to its base current and hence electric current of hfe times as high as the base current supplied from the PMOS transistor 13 flows through the base of the NPN type bipolar transistor 12. For example, the ESD current flowing through the NPN type bipolar transistor 12 becomes as high as 3A, but, if the hfe of the transistor 12 is given as being 3, the base current flowing from the PMOS transistor 13 into the base of the transistor 12 may be reduced in the order of 1A.

By doing so a discharge current resulting from the ESD voltage which is applied to the external connection terminal T1 is quickly and effectively absorbed by the NPN type bipolar transistor 12 and bypassed to the grounded terminal T2, so that the internal circuit 11 is protected from any damage resulting from the ESD voltage and an ESD current caused thereby.

A hold voltage Vh applied to the internal circuit 11 at a time of absorbing the ESD current becomes equal to a base-to-emitter voltage $V_{BE}$ of the NPN type bipolar transistor 12 or a threshold voltage $V_{th}$ of the turned-ON state PMOS transistor 13 whichever is higher. For example, when $V_{th}$=0.4 volt and $V_{BE}$=0.7 volt, then the hold voltage Vh of the protection circuit of this embodiment is 0.7 volt.

Since, in this embodiment, the hold voltage can be set to a very low level, the shrinkage of constitution elements in the internal circuit 11 is progressed and, even if, for example, the breakdown voltage of the gate insulation of the MOS transistor is lowered, the internal circuit 11 is adequately protected from any damage resulting from the ESD voltage. Further, the constituent elements in the protection circuit is small in size and, even if, for example, a semiconductor integrated circuit device is constructed with the protection circuit incorporated therein, it can be realized in a small-sized unit.

Figure 6:
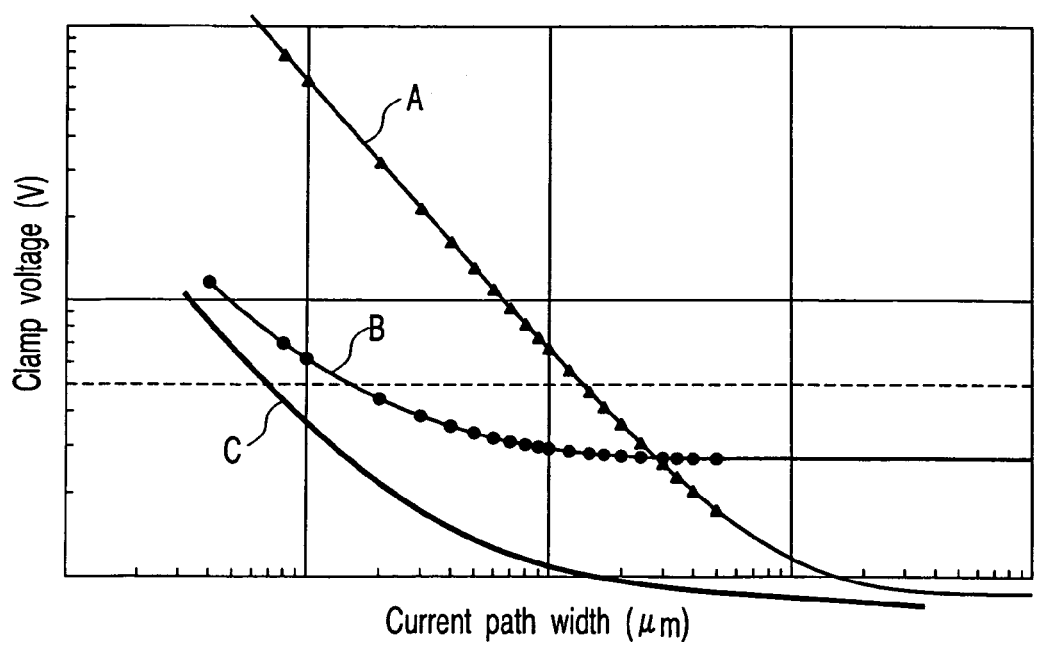
FIG. 6 is a graph showing a relation of a current path width and clamp voltage of an NPN type bipolar transistor used in the embodiment shown in FIG. 1 to those of a conventional protection circuit element.

FIG. 6 is a graph showing a relation between a current path width and a clamp voltage (hold voltage) of the NPN type bipolar transistor 12, that is, an ESD current bypass element in the protection circuit of the embodiment shown in FIG. 1 as well as that of a conventional protection circuit. Here, the current path width represents a channel width of the element through which an ESD current flows. That is, the current path width is a channel width formed in the base region of the bipolar transistor and a gate width in the case of the MOS transistor.

In FIG. 6, the curve A shows a relation between the clamp voltage and the gate width, that is, the current path width of the MOS element for clamping in the conventional ESD protection circuit. As evident from the curve A, the clamp voltage becomes much greater for the conventional case if the gate width size of the MOS element is made lower.

The curve B shows the clamp voltage/current path width characteristic of the protection circuit using a conventional SCR element and it is found that, at a smaller size area, that is, at a smaller current path width area, the clamp voltage can be made comparatively low compared with the case of the curve A. If, however, the current path width of the SCR element is made greater so as to obtain a greater current capacity, there is a limit in the lowering of the clamp voltage. At a current path width area greater than at a crosspoint between the curve B and the curve A, the clamp voltage at the curve B becomes higher than at the curve A.

In comparison with these conventional protection circuits it is evident that, in the embodiment of FIG. 1 as indicated by the curve C, all the current path width area is lower than these curves A and B for the conventional cases and, hence, it can secure an adequate shrinkage of the element of the internal circuit of the semiconductor device.

It is to be noted that, in the embodiment shown in FIG. 1, the NPN type bipolar transistor 12 is supplied with a base current from the PMOS transistor 13 to turn it ON. Therefore, the resistor 14 constitutes no essential element and may be omitted.

Further, the NPN type bipolar transistor 12 is turned ON upon receipt of the base current from the PMOS transistor 13 and it is so configured as not to be turned ON unless the PMOS transistor 13 is turned ON. If, however, the NPN type bipolar transistor 12 is erroneously turned ON for some cause or other, there occurs an inconvenience that a short-circuiting takes place between the power supply lines L1 and L2. When, therefore, the internal circuit 11 is normally operated under a rated power supply voltage across the power supply lines L1 and L2, then the NPN type bipolar transistor 12 is necessarily held in an OFF state.

FIG. 2 is a block circuit diagram showing a second embodiment of the present invention which can prevent any inconvenience resulting from an above-mentioned erroneous operation of an NPN type bipolar transistor 12. Here, the same or similar reference numerals are employed to designate the same or similar parts or elements corresponding to those in the embodiment shown in FIG. 1 and any further explanation of them is, therefore, omitted.

In the second embodiment, out of the PMOS transistor 13 and resistor 14 forming a base current supply circuit for the transistor 12 shown in FIG. 1, an NMOS transistor 14a is used in place of the resistor 14, and the NMOS transistor 14a is combined with a PMOS transistor 13 to form an inverter circuit 17. As shown in FIG. 2, the gate of the NMOS transistor 14a and gate of the PMOS transistor 13 are commonly connected to a connection node between a resistor 15 and a capacitor 16, and the source and drain of the NMOS transistor 14a are respectively connected to the base and emitter of the NPN type bipolar transistor 12. As a result, these transistors 13 and 14a provide a CMOS-type inverter 17.

In FIG. 2, the NPN type bipolar transistor 12 constitutes a clamp element for protecting an internal circuit 11 from an ESD voltage across the power supply lines L1 and L2 as in the case of FIG. 1, and the resistor 15 and capacitor 16 constitute an ESD voltage detection circuit. This embodiment is different from the first embodiment of FIG. 1 in that the connection node between the resistor 15 and the capacitor 16 in this detection circuit is connected to an input side of the CMOS-type inverter circuit (logical circuit) 17 in place of being connected to the PMOS transistor 13. The output side of the inverter circuit 17 is connected to the base of the NPN type bipolar transistor 12.

In the normal state in which a rated power supply voltage VDD is supplied to the power supply line L1, the input of the inverter circuit 17 is placed in a H level state as in the case of the embodiment shown in FIG. 1 and the NMOS transistor 14a is turned ON and the output of the inverter circuit 17 is placed in a L level state. Thus, the base of the transistor 12 is connected to the grounded power supply line L2 through a low resistance state NMOS transistor 14a in the inverter circuit 17 and the NPN type bipolar transistor 12 is positively maintained in an OFF state which is maintained logically.

When a high ESD voltage is applied to the terminal T1 with the voltage VDD not applied, the input of the inverter circuit 17 is placed in a L state to cause the PMOS transistor 13 to be turned ON, so that a base current is supplied to the base of the transistor 12. As a result, the transistor 12 is turned ON and an ESD current flows from the terminal T1 quickly toward the terminal T2 for discharge.

When, due to this discharge, the ESD voltage on the terminal T1 is lowered below a predetermined level, then the input side of the inverter circuit 17 is placed in a H level due to a stored charge of the capacitor 16. As a result, the NMOS transistor 14a is turned ON and the transistor 12 is turned OFF, so this state is logically held.

In this way, in the second embodiment shown in FIG. 2, when the internal circuit 11 is operated in a normal state due to a rated power supply voltage across the power supply lines L1 and L2, then the NPN type bipolar transistor 12 is necessarily held logically in an OFF state.

FIG. 3 shows another or third embodiment. Although, in the embodiment shown in FIG. 1, the protection circuit is provided relative to the power supply line L1, it can also be provided relative to an I/O terminal T3 of an internal circuit 11. As shown in FIG. 3, the I/O terminal T3 is connected to the internal circuit 11 through a buffer 18 and, here, is used as an output terminal. Here, the same reference numerals are employed to designate parts or elements corresponding to those shown in FIGS. 1 and 2 and any further explanation thereof is omitted.

In this embodiment, an NPN type bipolar transistor 12b is connected between the terminal T3 and a grounded power supply line L2 and serves as a clamp element of a protection circuit for an I/O circuit in the internal circuit 11 (not shown). A resistor 15b and capacitor 16b constitute a detection circuit for detecting an ESD voltage applied to the terminal T3 and a detection output is supplied to one input terminal of a logical circuit or a NOR gate 19 from a connection node between the resistor 15b and the capacitor 16b.

A voltage on the power supply line L1 is supplied to the other input terminal of the NOR gate 19 and the power supply terminals T1 and T2 are connected respectively to the power supply lines L1 and L2. The output side of the NOR gate 19 constitutes an inverter. As this inverter use is made of the same type as the CMOS-type inverter circuit 17 shown in FIG. 2.

In this configuration, when a rated power supply voltage is supplied to the terminal T1 with an ESD voltage not applied to the terminal T3, an H level voltage is normally supplied from the power supply line L1 to the one input terminal side of the NOR gate 19. In this state, an H level or L level logical signal is outputted from the internal circuit 11 through the inverter 18. Therefore, the output level of the detection circuit comprising the resistor 15b and capacitor 16b becomes either an H or L level, but, in either case, the output of the NOR gate 19 necessarily becomes a L level since the other input side of the NOR gate is in the H level. As a result, the base potential of the NPN type bipolar transistor 12 is clamped to an L level and it is possible to logically prevent the transistor 12 from being erroneously turned ON.

When, here, an ESD voltage is applied to the terminal T3 with any power supply voltage not supplied across the terminals T1 and T2, the connection node between the elements 15b and 16b for ESD detection becomes an L state. Since, at this time, the input side of the NOR gate 19 connected to the terminal T1 is also in the L state, the output of the inverter circuit of the NOR gate 19 becomes an H level and the NPN type bipolar transistor 12b is turned ON as in the case of the embodiment shown in FIG. 2. As a result, an ESD current caused by the ESD voltage supplied to the terminal T3 rapidly flows through the transistor 12b to the grounded power supply line L2 for discharge.

Figure 4:
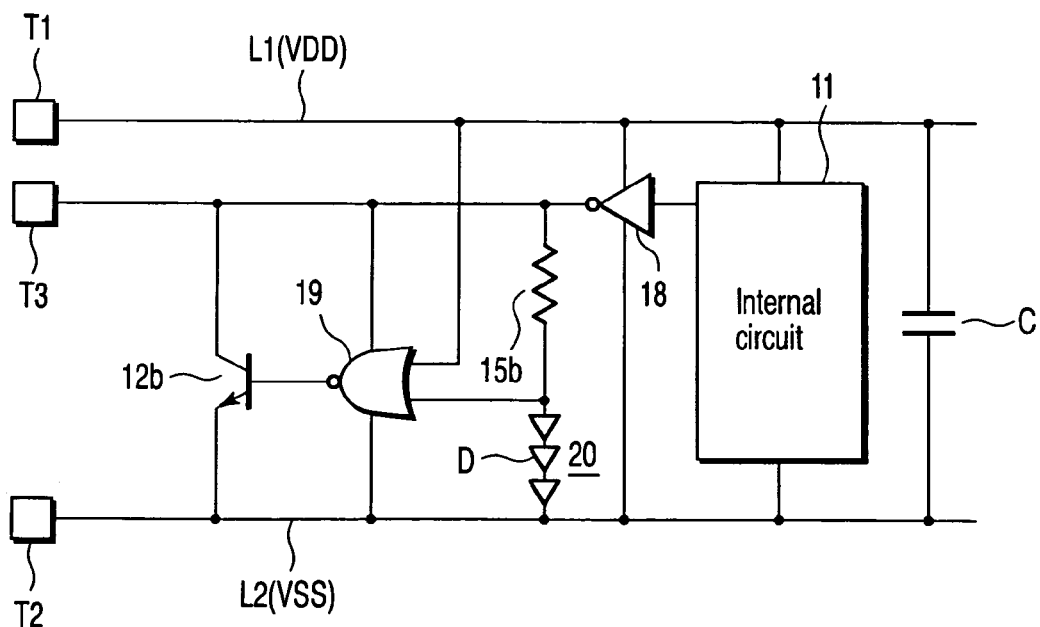
FIG. 4 is a block circuit diagram showing a circuit arrangement of a further embodiment of the present invention.

Although, in the protection circuit shown in FIG. 3, the input logical level of the NOR gate 19 is set by the use of the capacitor 16b, use may be made of, in place of the capacitor 16b, a series circuit 20 comprised of series-connected diodes D (three diodes D, in this case) as shown in FIG. 4. Across the series circuit 20, a total sum of the forward voltages of the series-connected diodes D emerge and an input logical level of the NOR gate 19 is set with the use of these series-connected diodes D. Through the diode's series circuit 20 no current flows during a time period in which a normal operation voltage is applied between the terminals T3 and T2. When, on the other hand, an abnormal voltage higher than the normal voltage caused by an ESD voltage is applied to the terminal T3, a current flows through the circuit 20 while a voltage across the diode's series circuit 20 ceased to increase. With the use of a non-linear characteristic between the voltage and current across the forward-connected diode array circuit 20, a voltage across the diode circuit 20 whose rate of an increase is changed partway to "low" is applied as the input of the NOR gate 19. That is, until a voltage across each diode in the circuit 20 reaches its threshold voltage, almost no current flows through the diode circuit 20 and a voltage level on the connection node between the resistor 15b and the diode circuit 20 is placed in an L level state. Therefore, the NOR gate 19 delivers an H level output and the NPN type bipolar transistor 12b is rapidly turned ON, so that the ESD current is discharged. When the voltage across the diode's series circuit 20 exceeds the threshold value, the current rapidly increases, while there occurs a greater gradient variation across the diode's series circuit 20, and a greater voltage drop occurs across the resistor 15b. As a result, the input level L of the NOR gate 19 is maintained and the output level of the NOR gate 19 is maintained at an H level. As a result, the ESD current is quickly discharged. Even in this case, a CMOS-type inverter circuit is connected to the output side of the NOR gate 19 and, as in the case of FIG. 2, a base current is supplied to the NPN type bipolar transistor 12b.

In the embodiment shown in FIG. 4, the remaining circuit configuration is the same as that of the embodiment shown in FIG. 3.

Figure 5:
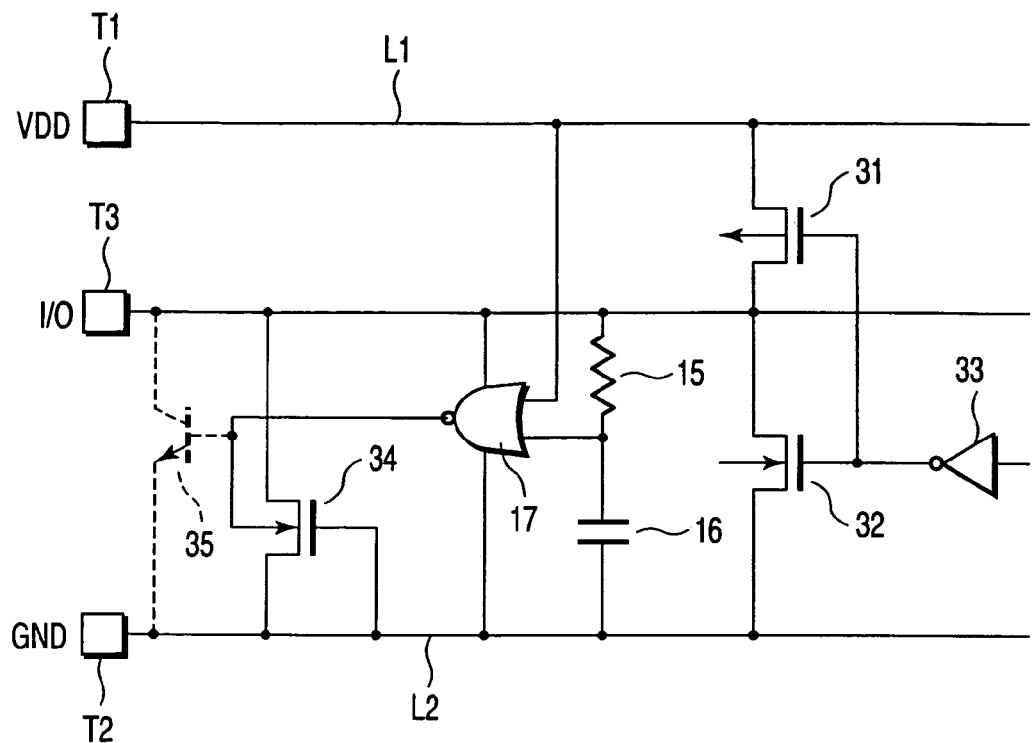
FIG. 5 is a block circuit diagram showing a circuit arrangement of a still further embodiment of the present invention.

With reference to FIG. 5, another embodiment of the present invention will be described below. In FIG. 5, an inverter circuit formed of a PMOS transistor 31 and NMOS transistor 32 is connected across terminals T1 and T2. The gates of the transistors 31 and 32 are commonly connected to the output side of an inverter circuit 33 and the input side of the inverter circuit 33 is connected to a data input/output (I/O) terminal of an internal circuit not shown. The inverter circuit of the transistors 31 and 32, together with the inverter circuit 33, provide an I/O buffer circuit.

An I/O protection circuit is connected across the I/O buffer circuit and a data input/output (I/O) terminal T3. The I/O protection circuit comprises an ESD detection circuit comprised of a series circuit of a resistor 15 and capacitor 16 connected across terminals T3 and T2, a NOR circuit 17 configured to be driven by a voltage across the terminals T1 and T2 and to receive, as a logical input, a voltage on the terminal T1 and an output of the ESD detection circuit, and an NMOS transistor 34 having a back-gate region supplied with an output of the NOR circuit 17 and a grounded gate and connected across the terminals T2 and T3. Further, in the embodiment shown in FIG. 5, a parasitic NPN type bipolar element 35 is provided having a P type back-gate region of the NMOS transistor 34 as a base and N-type source and drain regions of the NMOS transistor 32 as a collector and emitter, respectively. In FIG. 5, the parasitic NPN type bipolar element 35 is indicated by broken lines. The NPN type bipolar element 35 acts as an ESD discharging element. By doing so, it is possible to realize a simpler structure of an ESD protection circuit for the I/O buffer circuit and to reduce an occupation area on a semiconductor chip.

Figure 7:
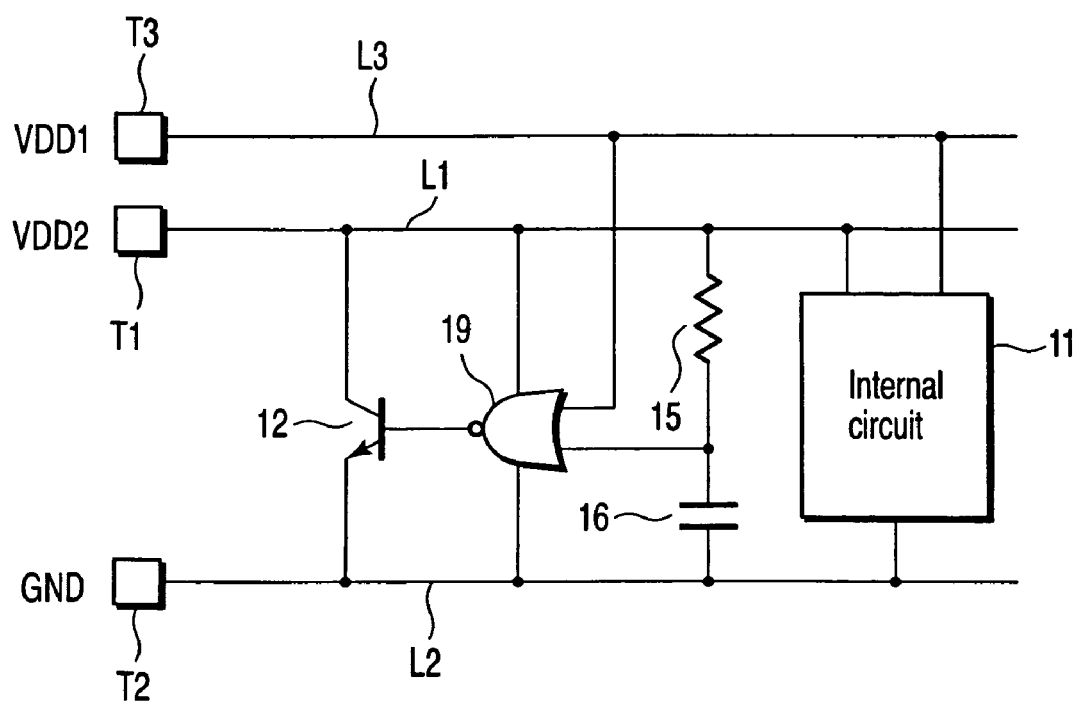
FIG. 7 is a block circuit diagram showing a circuit arrangement of still another embodiment of the present embodiment.

FIG. 7 is a block circuit diagram showing a circuit arrangement of still another embodiment of the present invention. In FIG. 7, the same or similar reference numerals are employed to designate parts or elements corresponding to those shown in the first to fifth embodiment of the present invention and any further explanation of the configuration is, therefore, omitted. In FIG. 7, an internal circuit 11 includes, for example, a logical circuit and a memory circuit driven by power supply voltages VDD1 and VDD2 respectively supplied from terminals T1 and T3. The power supply voltage VDD1 is supplied from the terminal T1 through the power supply line L3 and the power supply voltage VDD2, for example, lower than the power supply voltage VDD1 is supplied from a terminal T3 through a power supply line L1. The internal circuit 11 is connected between the grounded power supply line L2 and the power supply lines L1 and L3.

An ESD detection circuit comprising a resistor 15 and capacitor 16 is connected between the power supply line L1 and grounded line L2. The output of the ESD detection circuit is supplied to one input of an NOR gate 19 and the second power supply voltage VDD2 from the power supply line L3 is supplied to the other input of the NOR gate 19. The output of the NOR gate 19 is supplied to the base of the NPN type bipolar transistor 12 having a collector and an emitter connected across the power supply lines L1 and L2.

Now it is assumed that, in the circuit arrangement shown in FIG. 7, no power supply voltages VDD1 and VDD2 are supplied to the power supply lines L3 and L1. When, in this state, any surge voltage such as an ESD voltage is applied, for example, to one terminal T1, the ESD detection circuit formed of the resistive element 15 and capacitor 16 detects this surge voltage and a corresponding input terminal of the NOR gate 19 becomes an L level. The other input terminal side of the NOR gate 19, being connected to the power supply line L3, becomes an L level. As a result, an H level output from the NOR gate 19 is supplied to the base of the NPN type bipolar transistor 12 and a base current is supplied thereto from an inverter included in the NOR gate 19, thus turning the transistor 12 ON to allow the ESD current to be quickly discharged. It is to be noted that, when either one or both power supply voltages VDD1 and VDD2 is/are supplied to either one or both the power supply lines L3 and L1, the output of the NOR gate 19 becomes an L level in either case to cause the NPN type bipolar transistor 12 not to be turned ON, that is, the protection circuit not to be operated.

In this way, only in the case where no power supply voltages VDD1 and VDD2 are supplied to the power supply lines L3 and L1, the circuit of the embodiment shown in FIG. 7 effectively acts as a protection circuit against the ESD voltage as has been set out above. If, however, a normal power supply voltage is fed to at least one of the power supply lines L1 and L3, an H level voltage is supplied to the one input side of the NOR gate 19. This causes an L level to be outputted from the NOR gate 19 and the NPN type bipolar transistor 12 not to be turned ON. It is, therefore, possible to positively prevent the associated element from being destroyed. It is to be noted that these voltages VDD1 and VDD2 may be set to the same values or one of these voltages may be set to be higher than the other.

Although, in the circuit arrangement shown in FIG. 7, one logical input to the NOR gate 19 is obtained from the power supply line L3. If, one more similar circuit set is used, in which one logical input to an NOR gate is obtained from the power supply line L1 and an ESD detection circuit is connected across the other-side power supply line L3 and the grounded power supply line L2, it is possible to construct a protection circuit by which protection can be secured against any ESD emerging on either one of the power supply lines L1 and L3. Even in the case where three or more power supply lines are provided relative to the internal circuit 11, a countermeasure can be taken by providing an associated protection circuit shown in FIG. 7 relative to the corresponding power supply lines.

Further, when the voltages VDD1 and VDD2 differ, then an associated circuit shown in FIG. 7 is provided relative to the corresponding power supply voltage and, by properly setting the threshold value of a corresponding NOR circuit, it is possible to, relative to that different voltage, perform a corresponding operation positively. If, in FIG. 7, for instance, the voltages VDD1 and VDD2 are set to 3V and 1.5V, respectively, the threshold value of the NOR gate 19 may be set to, for example, 0.8V.

As set out above, according to the embodiments of the present invention, it is possible to lower a hold voltage by the protection circuit resulting from the emergence of an ESD current. It is thus possible to provide a semiconductor device having a protection circuit capable of securing shrunk constituent elements.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A semiconductor device having a protection circuit, comprising:
   An NPN type bipolar transistor having a collector and an emitter connected between an external connection terminal and a reference terminal of a semiconductor device to be protected;
   a PMOS transistor having a drain terminal and a source terminal connected between a base and the collector of the NPN bipolar transistor and configured to supply a base current to the base of the NPN type bipolar transistor;
   a control circuit configured to supply a control signal to a gate of the PMOS transistor in response to a voltage emerging on the external connection terminal; and
   an NMOS transistor having drain and source terminals connected between the base and the emitter of the NPN type bipolar transistor and a gate terminal supplied with a control signal of the control circuit.

2. A semiconductor device having a protection circuit, comprising:
   an NPN type bipolar transistor having a collector and an emitter connected between a data input/output terminal of a semiconductor device to be protected and a reference terminal;
   a control circuit configured to output a control signal in response to a voltage emerging on a data input/output terminal; and
   a logical circuit having an output terminal connected to a base of the NPN type bipolar transistor and configured to perform a logical operation based on a voltage on at least one of power supply terminals of the semiconductor device to be protected and the control signal of the control circuit and to supply a base current from the output terminal to the base of the NPN type bipolar transistor only when the semiconductor device to be protected is in a non-operation state in which no operation voltage is supplied to the power supply terminals to enable the protection circuit,
   wherein said logical circuit includes an NOR circuit configured to receive a voltage on said power supply terminal and the control signal of said control circuit.

* * * * *